(No Model.)

H. W. KNIGHT.
RAIN WATER CUT-OFF.

No. 418,290. Patented Dec. 31, 1889.

WITNESSES:
Barton Griffith
John H. Travel

INVENTOR
HENRY W. KNIGHT
BY C. C. Shepherd
ATTORNEY.

UNITED STATES PATENT OFFICE.

HENRY W. KNIGHT, OF COLUMBUS, OHIO.

RAIN-WATER CUT-OFF.

SPECIFICATION forming part of Letters Patent No. 418,290, dated December 31, 1889.

Application filed September 27, 1889. Serial No. 325,324. (No model.)

*To all whom it may concern:*

Be it known that I, HENRY W. KNIGHT, a citizen of the United States, residing at Columbus, in the county of Franklin and State of Ohio, have invented a certain new and useful Improvement in Rain-Water Cut-Offs, of which the following is a specification.

My invention relates to the improvement of rain-water cut-offs of that class by means of which the water from house-pipes is directed to a cistern or sewer, and has particular relation to the improvement of a former invention for which Letters Patent No. 410,597 were granted me on the 10th day of September, 1889, and wherein the objects stated were to provide a device of this class so constructed and located as to prevent the necessity of using more than one cut-off for a building, to so locate the cut-off tank as to prevent it becoming clogged by freezing, to so construct the same as to admit of the water passing therethrough being readily and easily directed to a cistern or sewer, and to construct said device in a simple and inexpensive manner.

The objects of my present invention are to provide a superior means of closing and opening the pipes or passages through which rain-water is directed from my improved box to the cistern or sewer. These objects I accomplish in the manner illustrated in the accompanying drawings, in which—

Figure 1:
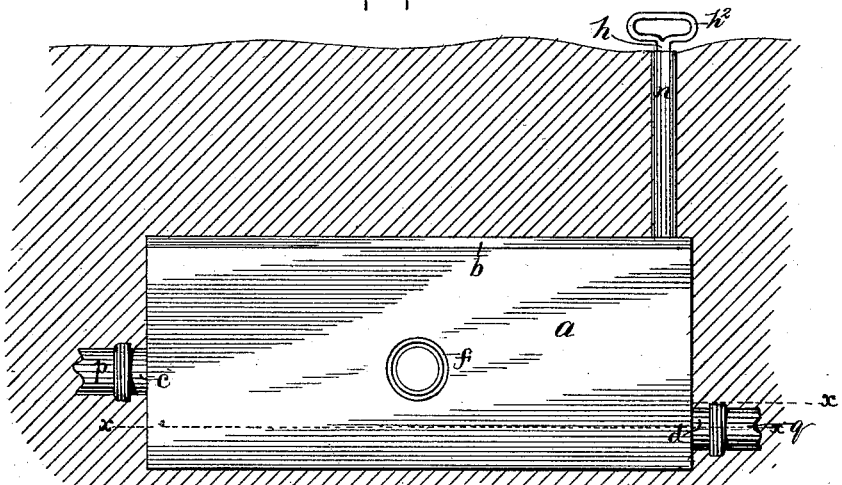
Figure 2:
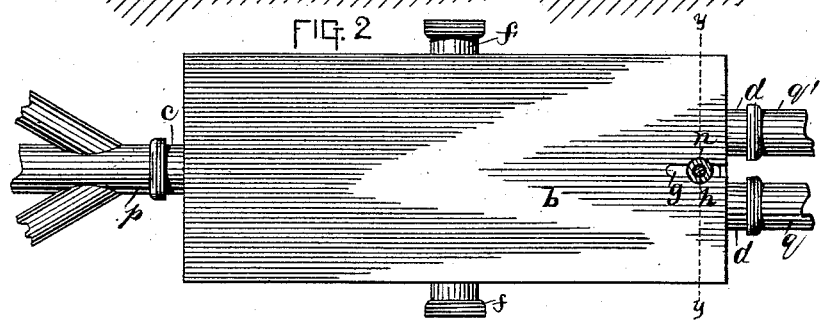
Figure 3:
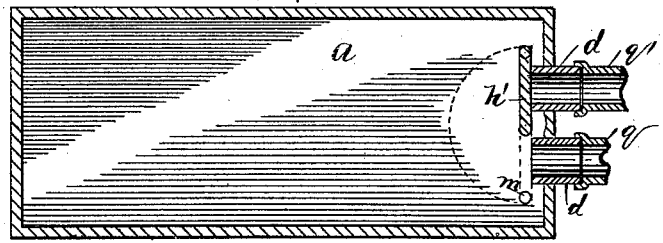
Figure 4:
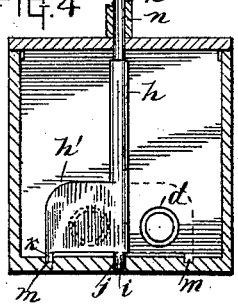

Figure 1 is a side elevation of my improved cut-off box or tank. Fig. 2 is a plan view of the same, showing the operating-rod or cut-off handle and its casing in cross-section. Fig. 3 is a central longitudinal section taken on line $x$ $x$ of Fig. 1, and Fig. 4 is a transverse section taken on line $y$ $y$ of Fig. 2.

Similar letters refer to similar parts throughout the several views.

$a$ represents my improved cut-off box or tank, consisting, as shown, of an oblong box having a lid $b$, said box and lid being preferably formed of earthenware. Projecting outwardly from the rear end of the box $b$, and formed therewith near the center of its height, is a short pipe-socket $c$, said pipe-socket having a flaring mouth, as shown. Projecting from the opposite or forward end of the box and adjoining the lower side thereof are two short pipes $d$, the inner ends of which project slightly within the box. These pipes $d$ are formed integral with the box, and, as shown, project, respectively, from each side of the center of the width thereof. Formed with the box, and projecting from each side thereof near the center of its height and at oppositely-located points, is a short pipe-socket $f$. Formed in the lid $b$ at the center of its width, and opening at the forward end thereof, is a short longitudinal slot $g$.

$h$ represents a valve-closing key, consisting of a vertical stem or handle having projecting from its lower portion at right angles therewith a wing or valve plate $h'$. Projecting downwardly from the under side of the valve-key in vertical alignment with the stem $h$ is a pivot-pin $i$, and projecting downwardly from the underside of the wing $h'$ of the said key at a point beneath its outer portion is a second pivot-pin $k$, of about one-half the length of the pin $i$. The stem of the valve-key is made to pass and project, as shown, loosely through the top slot $g$, while its pivot or bearing pin $i$ rests within a pin-socket $j$, formed in the bottom of the box $a$ at the center of its width and in close proximity to that end through which lead the pipes $d$. Formed in the bottom of the box $a$, in transverse alignment with the socket $j$, are two shallow sockets $m$, within one of which is seated the pivot-pin $k$ of the key-plate. The upper portion of the stem $h$, which passes through the slot $g$, extends upwardly, as shown, and terminates at a distance above the box-top in a suitable form of finger-piece $h^2$. Surrounding that portion of the stem $h$ between the box-top and the stem finger-piece is a sheath consisting of a section of piping $n$, said sheath resting upon the upper side of the box-lid.

The above-described cut-off box is designed to be located within the ground in close proximity to a cistern, and at such depth as to bring the upper end of the handle-sheath $n$ about flush with the surface of the ground.

$p$ represents an inlet-pipe, which may be provided with one more branches, as shown, and which is connected with the pipe-socket $c$. Connected with one of the pipes $d$ is a pipe $q$, which leads to a cistern, and connected with the remaining pipe $d$ is a pipe $q'$, which leads to a sewer.

The pipe $p$ or its branches, or both, may be made to connect with one or more house or rain-water pipes at a point adjoining the building.

Owing to the herein-described construction and location of the cut-off key, it will be seen that, as shown in Figs. 3 and 4 of the drawings, the inner mouth or opening of one of the pipes $d$ will be normally closed by the contact therewith of the key-plate $h'$. It being desired to close the remaining pipe $d$, this may be accomplished by grasping the finger-piece $h^2$, elevating the stem $h$ until its pivot-pin $k$ is lifted from its socket $m$, and then rotating said key-stem until the pivot-pin $k$ drops into the remaining socket $m$ and the key-plate is bearing against the end of the remaining pipe $d$, as shown in dotted lines of Fig. 3.

The operation of my device is as follows: The herein-described cut-off box having been located within the earth, the above-described connections made therewith, and the earth filled in about the same, it will be seen that the rain-water from the building will be directed into the inlet-pipe $p$, and thence through the socket $c$ into the box $a$. The key-stem $h$ being so turned as to cause the outlet-pipe $q'$, which leads to the cistern, to be closed by the key-plate, it will be seen that the water will be allowed to escape from the box through the remaining pipe $d$ into pipe $q$, and thence into the sewer or other desired point. In this manner the water may be directed through either of the pipes $d$, as desired.

In case the number of house-pipes makes it necessary, it will be seen that an inlet-pipe having one or more branches, as described for the pipe $m$, may be made to enter the side sockets $f$.

By the above-described construction it will be seen that the entire cut-off is hidden from view with the exception of the upper portion of the key-stem, which, as shown, is allowed to project above the ground, and that the location of said box will operate to prevent its contents from freezing during cold weather.

Heretofore it has been customary to connect large buildings with a number of cut-offs; but by the herein-described device it will be seen that a number of house-pipes may be connected with one cut-off box, thus producing a saving of labor and expense.

It is obvious that the herein-described box might be adapted for use as a flushing-box for vaults by closing both openings $d$ and those inlet-openings not in use till the desired amount of water has accumulated within the box, when one of the openings $d$ may be opened and the water allowed to escape through suitable piping to a vault.

By the above description it will be seen that the necessity of using an elongated sheath for the cut-off handle or stem is obviated and that the opening formed in the box-lid is much smaller than that shown in my former patent. Owing to these facts, it is obvious that the tendency of said sheath to become clogged and the liability of the water contained within the box to become frozen are decreased. It will also be observed that a superior form of cut-off key is produced, by means of which the water may be readily directed from one pipe to another.

Having now fully described my invention, what I claim, and desire to secure by Letters Patent, is—

In a rain-water cut-off, the combination, with the box $a$, located within the earth and having pin-sockets $j$ and $m$ in its bottom plate, pipe-sockets leading into said box, outlet-pipes $d$, and detachable slotted box-lid $b$, of the valve-closing key having on its lower end the downwardly-projecting pivot-pin $i$, the latter loosely seated in box-socket $j$, and shorter pin $i$, adapted to be made to enter the desired one of the sockets $m$, as described, the stem of the key passing outward through the box-lid slot and projecting above the ground, substantially as and for the object specified.

HENRY W. KNIGHT.

In presence of—
C. C. SHEPHERD,
BARTON GRIFFITH.